United States Patent
Yraceburu et al.

(10) Patent No.: US 9,731,517 B1
(45) Date of Patent: Aug. 15, 2017

(54) PRINTING DEVICE DRYER SETTING

(71) Applicant: Hewlett-Packard Development Company, L.P., Houston, TX (US)

(72) Inventors: Robert Yraceburu, Camas, WA (US); Duane A. Koehler, Vancouver, WA (US); Brooke Hoyer, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/224,169

(22) Filed: Jul. 29, 2016

(51) Int. Cl.
*B41J 11/00* (2006.01)
*F26B 25/22* (2006.01)
*B41F 23/04* (2006.01)

(52) U.S. Cl.
CPC ........... *B41J 11/002* (2013.01); *B41F 23/044* (2013.01); *B41F 23/0406* (2013.01); *F26B 25/22* (2013.01)

(58) Field of Classification Search
CPC ..... B41J 11/002; F26B 25/22; B41F 23/0406; B41F 23/044; B41F 36/16
See application file for complete search history.

(56) References Cited

U.S. PATENT DOCUMENTS

| | | | |
|---|---|---|---|
| 4,566,014 A | 1/1986 | Paranjpe et al. | |
| 5,214,442 A | 5/1993 | Roller | |
| 5,349,905 A | 9/1994 | Taylor et al. | |
| 5,784,090 A * | 7/1998 | Selensky | B41J 11/002 347/102 |
| 7,517,075 B2 * | 4/2009 | Smith | B41J 11/002 346/25 |
| 7,840,031 B2 * | 11/2010 | Albertson | A63B 24/0003 382/103 |
| 8,186,272 B2 | 5/2012 | Reichelsheime et al. | |
| 8,959,792 B2 | 2/2015 | Walker et al. | |
| 9,590,967 B2 * | 3/2017 | Rich | G06F 21/74 |

FOREIGN PATENT DOCUMENTS

| | | |
|---|---|---|
| EP | 0025878 | 4/1981 |
| EP | 0720914 | 7/1996 |
| EP | 0771661 | 5/1997 |

OTHER PUBLICATIONS

Dubovoy, Mark, "In Search of the Ultimate Inkjet Print", Nov. 2010, 6 pages.
Epson, "Epson Stylus® Pro 4880 User's Guide", Sep. 23, 2008, pp. 125-130, 158-175; 252 pages.

* cited by examiner

*Primary Examiner* — Anh T. N. Vo
(74) *Attorney, Agent, or Firm* — Mannava Kang PC (57) ABSTRACT

According to an example, an apparatus may include a controller and a non-transitory computer readable medium on which is stored instructions. The instructions may cause the controller to predict that a user is to instruct a printing device to perform a printing operation, in which the printing device includes a dryer, identify the user in response to the prediction, to access a user profile corresponding to the identified user, in which the accessed profile identifies a type of document that the identified user typically prints, and to adjust a setting of the dryer according to the identified type of document in the accessed profile.

15 Claims, 5 Drawing Sheets

PRINTING DEVICE DRYER SETTING

BACKGROUND

In many printing systems, printing components, such as printheads are used to apply marking material (e.g., fluid or ink) onto a print media. The print media is typically driven past the printheads and through a dryer. The dryer heats the print media and dries the marking material onto the print media. The print media often moves quickly across the printing system in order to enable fast printing speeds. If the dryer is unable to adequately dry the marking material, the marking material may remain in liquid form and may thus be prone to smearing or other defects. However, if the dryer applies too much heat, over-drying may occur and the print media may become brittle or warped.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Additionally, It should be understood that the elements depicted in the accompanying figures may include additional components and that some of the components described in those figures may be removed and/or modified without departing from scopes of the elements disclosed herein. It should also be understood that the elements depicted in the figures may not be drawn to scale and thus, the elements may have different sizes and/or configurations other than as shown in the figures.

Disclosed herein are apparatuses and methods for operating a printing device dryer. In the apparatuses and methods disclosed herein, a controller may determine the setting at which the dryer is to be operated based upon a user profile of a user. That is, the controller may determine the dryer setting based upon the types of documents that the user typically prints, in which the types of documents may also be distinguished from each other by the fluid coverage levels on the documents. For instance, the controller may track the fluid coverage levels of the documents that a user typically prints and may determine a representative fluid coverage level for the user. The representative fluid coverage level may be associated with and/or correlated to a dryer setting. In addition, the representative fluid coverage levels and/or the dryer settings for a plurality of users may be stored in a data store, for instance, as respective user profiles of the users. When the controller determines that a user is to print a document, the controller may access the data store to determine from the user's profile the dryer setting for that user and may control the dryer to be set at the determined dryer setting.

The user may submit a print job that contains a fluid coverage level that is higher than the representative fluid coverage level for that user. In these instances, the controller may override the dryer setting associated with the user and may instead select a higher dryer setting for that print job. The controller may also maintain the dryer at the higher setting for a predetermined period of time following the printing of the document to enable maximum printing speed for subsequent print jobs, for instance, in the event that an additional print job having a fluid coverage level that is higher than the representative fluid coverage level for that user is received during the predetermined period of time.

Through implementation of the apparatuses and methods disclosed herein, printing device dryers may be operated to deliver high printing performance while reducing electricity consumption. For instance, printing device dryers may be set at levels below maximum output levels for those users that do not typically print documents that require the dryers to be set at maximum levels. However, when a document requiring the higher setting is to be printed, the dryers may be set to the higher setting and may be held at that higher setting to ensure high printing performance for later printed documents.

Figure 1:
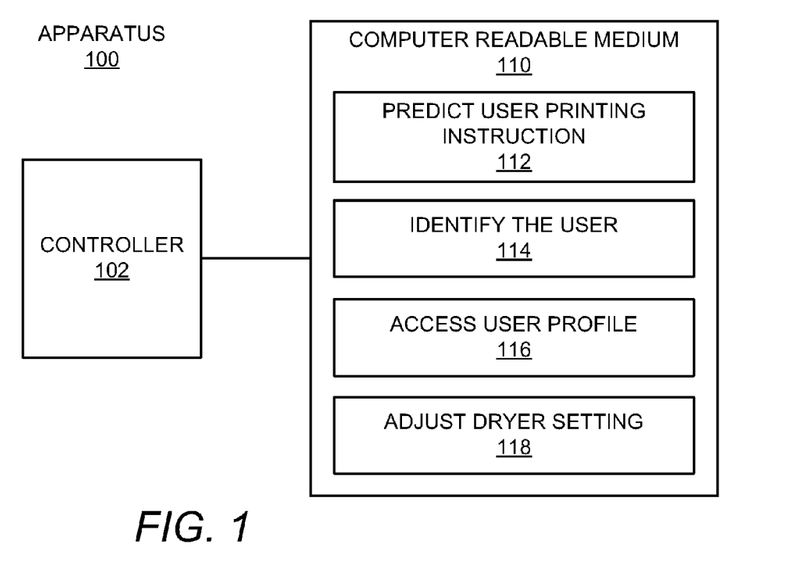
FIG. 1 depicts a simplified block diagram of an example apparatus.

With reference first to FIG. 1, there is shown a simplified block diagram of an example apparatus 100. It should be understood that the apparatus 100 depicted in FIG. 1 may include additional components and that some of the components described herein may be removed and/or modified without departing from a scope of the apparatus 100 disclosed herein.

The apparatus 100 may be a computing device such as a personal computer, a server computer, a laptop computer, a tablet computer, a smartphone, or the like. In another example, the apparatus 100 may be a processing component of a printing device such as a multi-function printer, a locally connected printer, a networked printer, or the like. In any regard, the apparatus 100 may include a controller 102 and a computer readable medium 110. The controller 102 may be a semiconductor-based microprocessor, a central processing unit (CPU), an application specific integrated circuit (ASIC), or other hardware device.

The computer readable medium 110 may have stored thereon computer readable instructions 112-118 (which may also be termed machine readable instructions) that the controller 102 may execute during runtime. More particularly, the controller 102 may fetch, decode, and execute the instructions 112 to predict that a user is to instruct a printing device having a dryer to perform a printing operation, the instructions 114 to identify the user in response to the prediction, the instructions 116 to access a user profile corresponding to the identified user, in which the accessed profile identifies a type of document that the identified user typically prints, and the instructions 118 to adjust a setting of the dryer according to the identified type of document in the accessed profile. As another example or in addition to retrieving and executing instructions, the controller 102 may include one or more electronic circuits that include components for performing the functionalities of the instructions 112-118.

The computer readable medium 110 may be any electronic, magnetic, optical, or other physical storage device that contains or stores executable instructions. Thus, the computer readable medium 110 may be, for example, Random Access Memory (RAM), an Electrically Erasable Programmable Read-Only Memory (EEPROM), a storage device, an optical disc, and the like. The computer readable medium 110 may be a non-transitory machine-readable storage medium, where the term "non-transitory" does not encompass transitory propagating signals.

Figure 2:
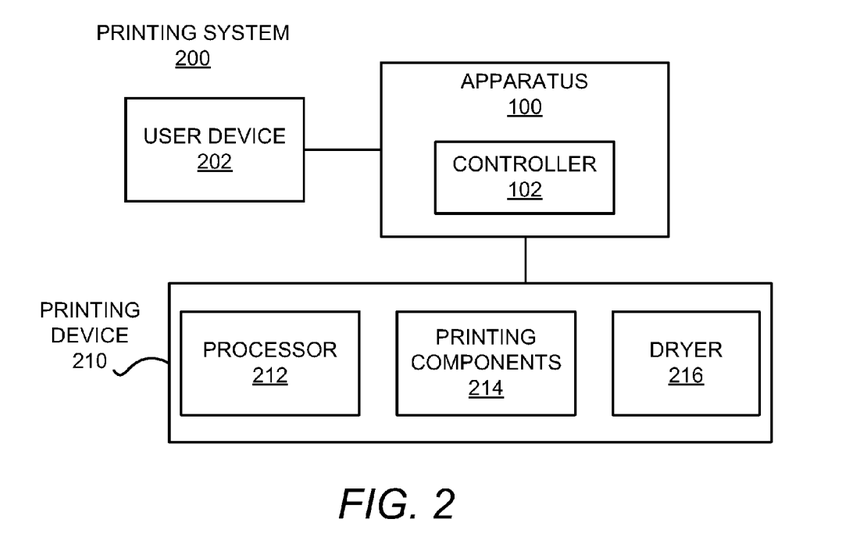
FIG. 2 depicts a simplified block diagram of an example printing system.

Turning now to FIG. 2, there is shown a simplified block diagram of an example printing system 200 in which the apparatus 100 depicted in FIG. 1 may be implemented. It should be understood that the printing system 200 depicted in FIG. 2 may include additional components and that some of the components described herein may be removed and/or modified without departing from a scope of the printing system 200 disclosed herein.

The printing system 200 may include a user device 202 and a printing device 210. The printing device 210 may also include a processor 212, printing components 214, and a dryer 216. The processor 212 may be a hardware processor such as a CPU, a microprocessor, or the like. The printing components 214 may include, for instance, printheads or other devices to deliver marking material, e.g., ink or other fluid, actuators for feeding a print media, etc. The printing system 200 may also include the apparatus 100 depicted in FIG. 1. The user device 202 may be a computing device, such as a personal computer, a laptop computer, or the like, through which a user may submit print jobs to be printed by the printing device 210. Although a single user device 202 has been shown, it should be understood that the printing system 200 may include any number of user devices 202 through which any number of users may submit print jobs.

According to an example, the apparatus 100, and more particularly, the controller 102, may directly receive or may intercept the print jobs communicated from the user device(s) 202 to the printing device 210. As discussed in greater detail herein, the controller 102 may track the types of documents that a user typically prints and may associate that information with a user profile of the user. Similarly, the controller 102 may track the types of documents that multiple users typically print and may associate that information with respective user profiles of the users. The controller 102 may distinguish the types of documents based upon whether the documents are spreadsheets, word processing documents, presentation slides, computer-aided design drawings, etc. In another example, the controller 102 may distinguish the types of documents based upon the fluid coverage levels on the documents printed by the printing components 214 of the printing device 210. That is, the controller 102 may determine the amount of marking material that the printing components 214 typically apply for the documents that a user typically prints.

Additionally, based upon the collected information regarding the types of documents and/or the coverage levels, the controller 102 may determine a setting at which the dryer 216 is to be set prior to a user submitting a print job. The setting may be any of a plurality of different settings, in which the settings may control the amount of heat that is applied to a printed print media. However, if the user typically prints documents that have relatively low fluid coverage levels, e.g., word processing documents, but the user instructs the printing device 210 to print a document having a relatively high fluid coverage level, e.g., a presentation slide, the controller 102 or the processor 212 may override the determined setting for the user with a relatively higher setting. In any regard, the amount of heat may be defined as either or both of the temperature and duration at which the dryer 216 is to apply heat onto the printed print media. According to an example, therefore, the dryer 216 may be controlled to operate at a setting that is based upon information pertaining to a user and not necessarily based upon the type of document that the user is currently printing.

Although the apparatus 100 has been depicted as being separate from the printing device 210, in other examples, the apparatus 100 may be integrated with the printing device 210. In these examples, the controller 102 and the processor 212 may be the same component.

Figure 3:
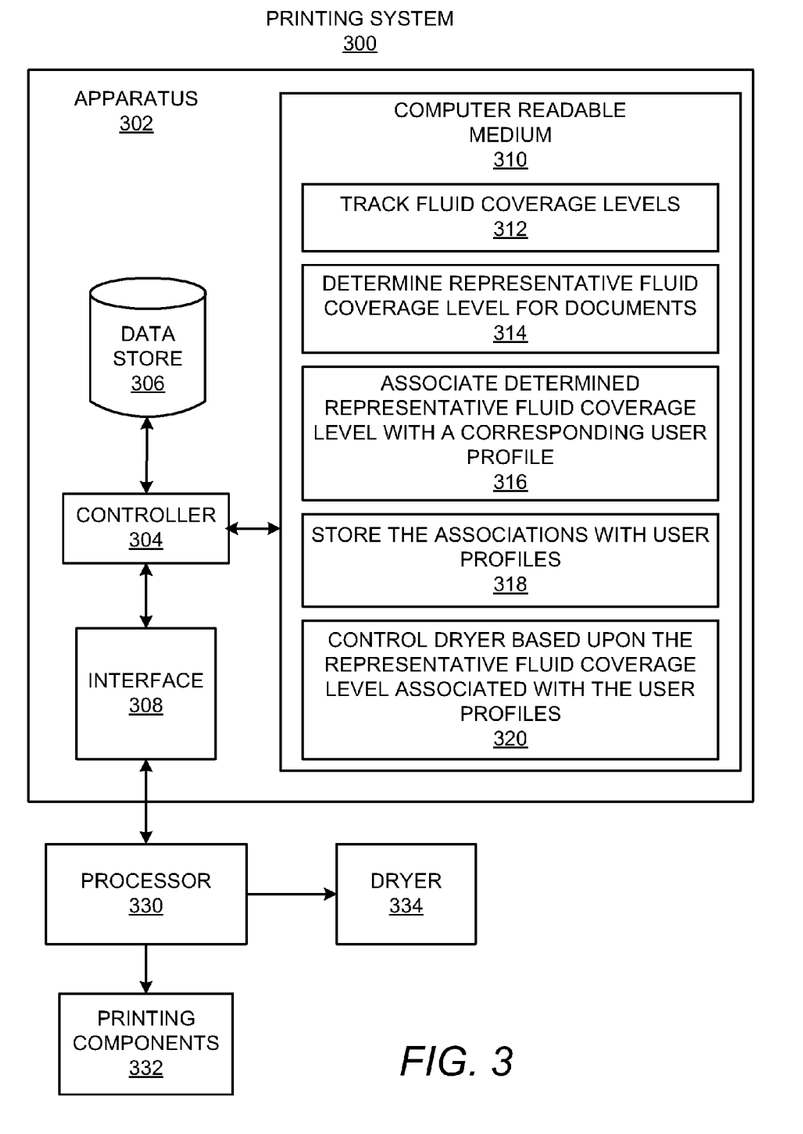
FIG. 3 depicts a simplified block diagram of another example printing system.

With reference now to FIG. 3, there is shown a simplified block diagram of another example printing system 300. It should be understood that the printing system 300 depicted in FIG. 3 may include additional components and that some of the components described herein may be removed and/or modified without departing from a scope of the printing system 300 disclosed herein.

The printing system 300 may include an apparatus 302, a processor 330, printing components 332, and a dryer 334. The apparatus 302 may include a controller 304, a data store 306, an interface 308, and a computer readable medium 310. The controller 304, which may be a microprocessor, a micro-controller, an application specific integrated circuit (ASIC), or the like, may perform various processing functions in the apparatus 302. The processing functions may include invoking or implementing the instructions 312-320 stored in the computer readable medium 310. According to an example, the computer readable medium 310 may be a hardware device on which is stored the instructions 312-320. The computer readable medium 310 may be, for instance, a volatile or non-volatile memory, such as dynamic random access memory (DRAM), electrically erasable programmable read-only memory (EEPROM), magnetoresistive random access memory (MRAM), memristor, flash memory, floppy disk, a compact disc read only memory (CD-ROM), a digital video disc read only memory (DVD-ROM), or other optical or magnetic media, and the like, on which software may be stored.

The controller 304 may store data in the data store 306 and may use the data in implementing the instructions 312-320. For instance, the controller 304 may store data pertaining to user profiles, settings for the dryer 334, correlations between the dryer 334 settings and the user profiles, etc. The controller 304 may also store data that is to be printed onto a print medium. In any regard, the data store 306 may be volatile and/or non-volatile memory, such as DRAM, EEPROM, MRAM, phase change RAM (PCRAM), memristor, flash memory, and the like. In addition, or alternatively, the data store 306 may be a device that may read from and write to a removable media, such as, a floppy disk, a CD-ROM, a DVD-ROM, or other optical or magnetic media.

The interface 308 may include hardware and/or software to enable the controller 304 to communicate with the processor 330. The interface 308 may also enable the controller 304 to access a network, such as an internal network, the Internet, etc., over which the controller 304 may receive print jobs, e.g., files containing data to be printed. The interface 308 may include a network interface card and/or may also include hardware and/or software to enable the controller 304 to communicate with various input and/or output devices, such as a keyboard, a mouse, a display, another computing device, etc., through which a user may input instructions into the apparatus 300.

The controller 304 may fetch, decode, and execute the instructions 312 to track fluid coverage levels on documents printed by each of a plurality of users, the instructions 314 to determine, for each of the plurality of users, a representative fluid coverage level for the documents that the user prints from the tracked fluid coverage levels, the instructions 316 to associate, for each of the plurality of users, the determined representative fluid coverage level with a corresponding user profile, the instructions 318 to store the associations with the user profiles in a data store, and the instructions 320 to control the printing device dryer 334 to operate at one of a plurality of settings based upon the representative fluid coverage level associated with the user profiles. As another example or in addition to retrieving and executing instructions, the controller 304 may include one or more electronic circuits that include components for performing the functionalities of the instructions 312-320.

The apparatus 302 may be equivalent to the apparatus 100 depicted in FIGS. 1 and 2 and the processor 330, the printing components 332, and the dryer 334 may respectively be equivalent to the processor 212, the printing components 214, and the dryer 216 in the printing device 210 depicted in FIG. 2. For instance, the instructions 112-118 stored in the computer readable medium 110 may correspond (e.g., may be sub-instructions), of the instruction 320 stored in the computer readable medium 310.

Additionally, the processor 330, the printing components 332, and the dryer 334 may form part of the apparatus 302. In these examples, the controller 304 and the processor 330 may be the same component.

Figure 4:
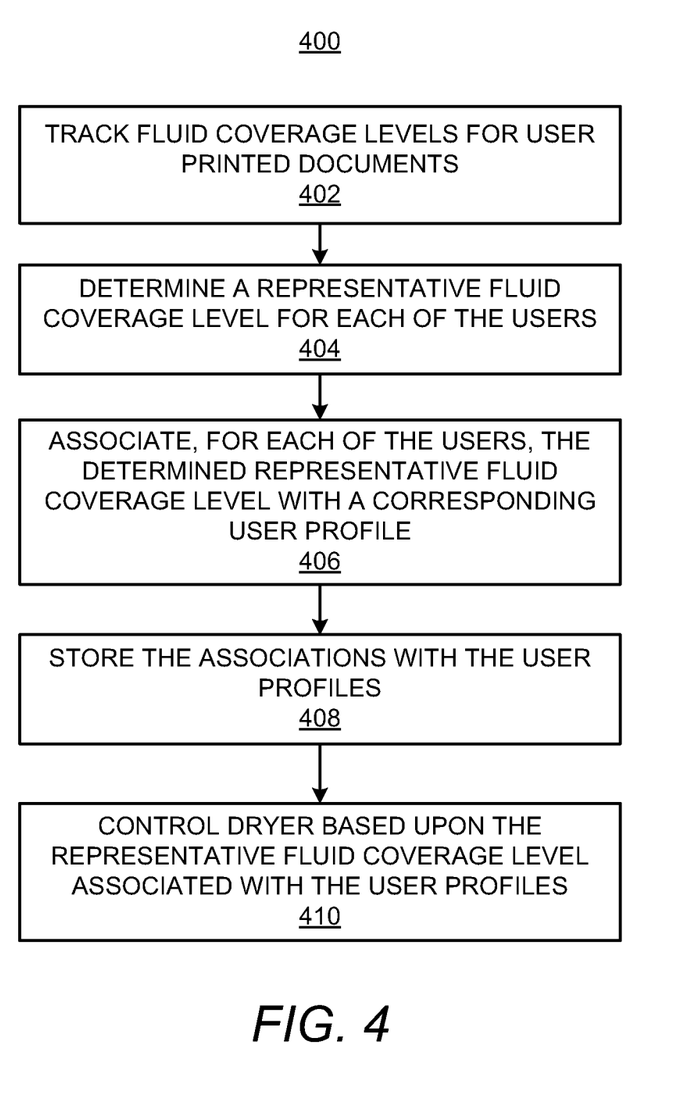
FIGS. 4-6, respectively, show flow diagrams of example methods for operating a printing device dryer.
Figure 5:
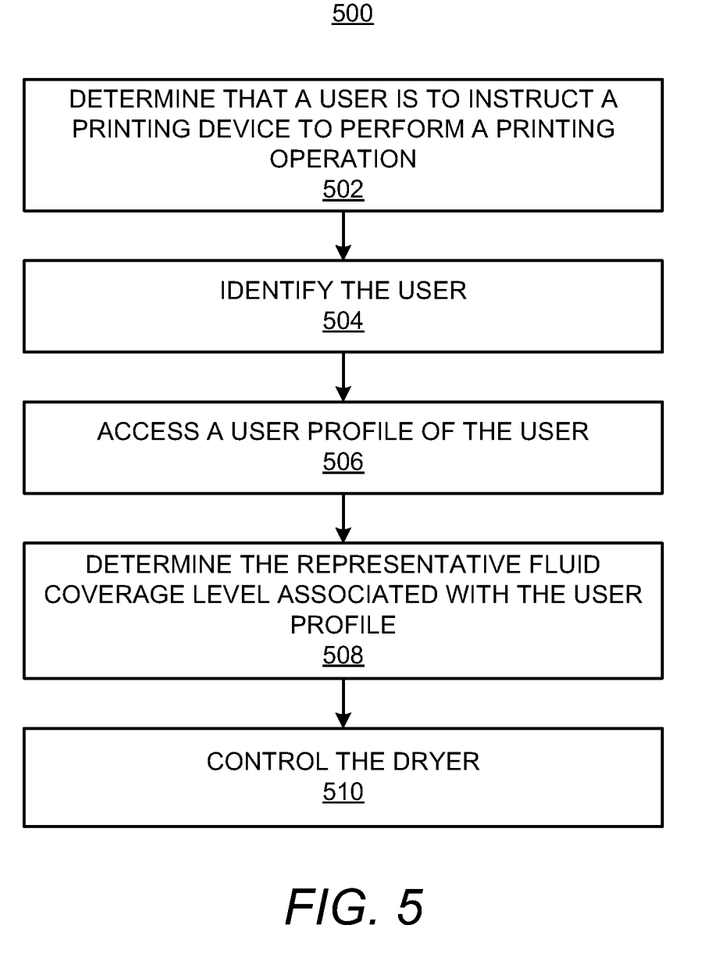
Figure 6:
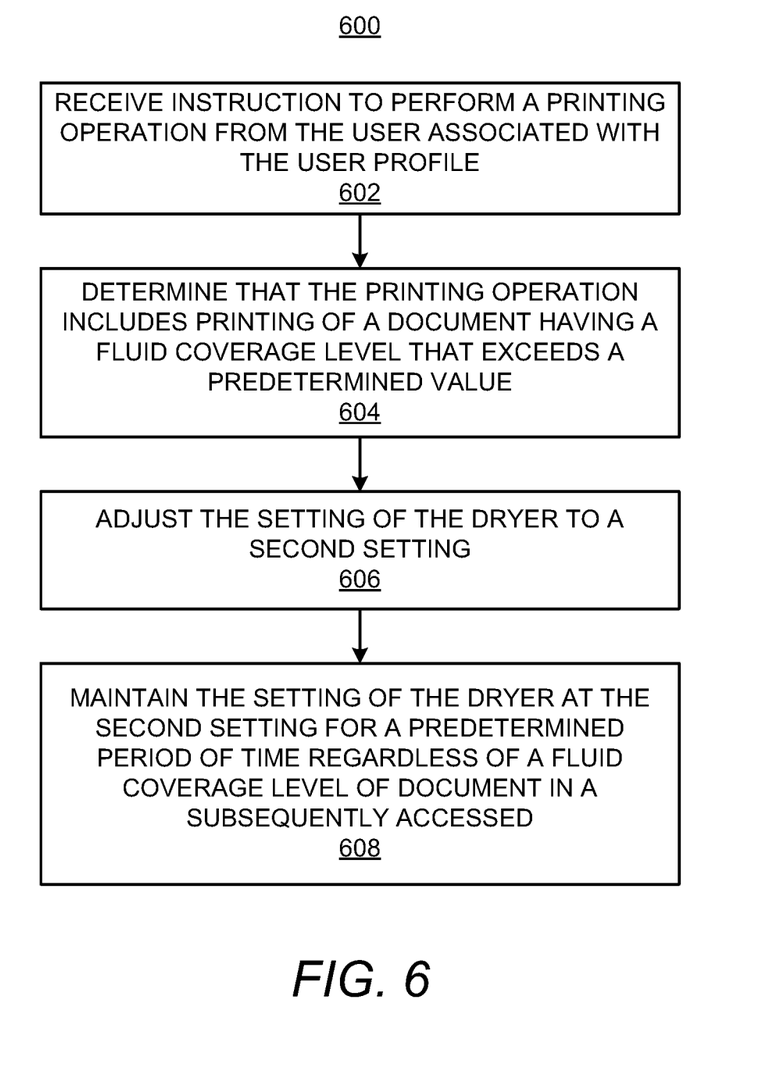

Various manners in which the controller 102, 302 in general, and the instructions 112-118 and 312-320 in particular, may be implemented are discussed in greater detail with respect to the methods 400-600 respectively depicted in FIGS. 4-6. Particularly, FIGS. 4-6, respectively, depict flow diagrams of example methods 400-600 for operating a printing device dryer 216, 334. It should be apparent to those of ordinary skill in the art that the methods 400-600 may represent generalized illustrations and that other operations may be added or existing operations may be removed, modified, or rearranged without departing from the scopes of the methods 400-600. Generally speaking, either of the controllers 102, 304 depicted in FIGS. 1 and 3 may implement some or all of the methods 400-600.

The descriptions of the methods 400-600 are made with reference to the apparatuses 100 and 302 illustrated in FIGS. 1-3 for purposes of illustration. It should, however, be clearly understood that apparatuses having other configurations may be implemented to perform any or all of the methods 400-600 without departing from the scopes of the methods 400-600.

With reference first to the method 400 depicted in FIG. 4, at block 402, fluid coverage levels on documents printed by each of a plurality of users may be tracked. For instance, the controller 304 may execute the instructions 312 to track the fluid coverage levels. By way of example, the controller 304 may receive and/or intercept print jobs from a user device 202 or from multiple user devices 202 and may determine the respective fluid coverage levels corresponding to the print jobs. The controller 304 may also track the fluid coverage levels of the documents printed by each of the plurality of users. The controller 304 may track the fluid coverage levels of the documents printed by each of the plurality of users over a predefined period of time, for instance, one day, one week, one month, multiple months, etc.

At block 404, for each of the plurality of users, a representative fluid coverage level for the documents that the user prints may be determined from the tracked fluid coverage levels. For instance, the controller 304 may execute the instructions 314 to determine the representative fluid coverage levels for the documents that the users have printed. The representative fluid coverage level for the documents that a user prints may be defined as the normal fluid coverage level, e.g., average, mean, etc., fluid coverage level, of the documents that the user prints.

At block 406, for each of the plurality of users, the determined representative fluid coverage level may be associated with a corresponding user profile. For instance, the controller 304 may execute the instructions 316 to generate a user profile for each of the plurality of users that includes a respective identification of each of the plurality of users. The controller 304 may also execute the instructions 316 to correlate the user identification with a corresponding representative fluid coverage level. Thus, for instance, each of the plurality of users may be assigned a user profile that associates and identity of the user and the representative fluid coverage level of the documents that the user has printed. According to an example, an administrator may select a default profile for new or unknown users and may update the user profile for those users as those users print documents.

At block 408, the associations of the determined representative fluid coverage levels and the user profiles may be stored in a data store 306. For instance, the controller 304 may execute the instructions 318 to store the associations of the determined representative fluid coverage levels with the corresponding user profiles in the data store 306.

At block 410, a printing device dryer 334 may be controlled to operate a one of a plurality of settings based upon the representative fluid coverage level associated with the user profiles. For instance, the controller 304 may execute the instructions 320 to determine the setting in which the dryer 334 of a printing device is to be operated based upon the information contained in the user profile stored in the data store 306. That is, for instance, each of the user profiles may include an association with a representative fluid coverage level for the user identified in the user profile. In addition, the representative fluid coverage level may correspond to one of the plurality of settings.

By way of example in which the dryer 334 has four settings, each of the representative fluid coverage levels may be assigned to one of the four settings depending upon the representative fluid coverage levels. For instance, the lowest 25% of the representative fluid coverage levels may be assigned to the lowest dryer setting, the second lowest 25% of representative fluid coverage levels may be assigned to the second dryer setting, and so forth. As another example, representative fluid coverage levels within a first range of levels may be assigned to the lowest dryer setting, representative coverage levels within a second range of levels may be assigned to a second lowest dryer setting, and so forth. According to an example, the user profiles may include the dryer settings corresponding to the user. In another example, the dryer settings corresponding to the user may be determined from the representative coverage levels identified in the user's user profile.

The dryer 334 may include any number of settings, e.g., from 2 to 10 settings, or the like. In addition, and each of these settings may correspond to a different amounts of heat that the dryer 334 applies to a print media. The different amounts of heat may include different temperatures and/or durations at which the dryer 334 applies at onto the print media.

Reference is now made to the method 500 depicted in FIG. 5, which may correspond to block 410 in the method 400 depicted in FIG. 4. That is, the method 500 may include additional operations that may be implemented with respect to block 410. Thus, for instance, the method 500 may be implemented in place of block 410 following implementation of blocks 402-408 in the method 400.

At block 502, the controller 102 may execute the instructions 112 to determine (or predict) that the user is to instruct a printing device 210 to perform a printing operation. The controller 102 may determine (or predict) that a user is to instruct a printing device 210 to perform a printing operation in any of a number of manners. For instance, the controller 102 may determine from historical information, that the user typically prints documents at a particular time each day and may thus predict that the user is likely to instruct the printing device 210 to print the documents at that particular time each day. This may occur, for instance, if the user prints a daily itinerary, a daily newsletter, or the like.

As another example, the controller 102 may determine (or predict) that the user is to instruct the printing device 210 to perform a printing operation based upon the user's interaction with a user device 202. For instance, the controller 102 may predict that the user is to instruct the printing device 210 to perform a printing operation in response to a determination that the user has opened a particular application or a particular menu of an application on the user device 202. By way of particular example, the controller 102 may predict that the user is to instruct the printing device 210 to perform a printing operation in response to the user opening the "file" menu and selecting the "print" button in the "file" menu on the user device 202.

At block 504, the controller 102 may execute the instructions 114 to identify the user that is to instruct the printing device 210 to perform the printing operation. The controller 102 may identify the user from, for instance, the user's log in information entered to access the user device 202, metadata associated with the user's interactions with the user device 202, or the like.

At block 506, the controller 102 may execute the instructions 116 to access a user profile of the identified user. For instance, the controller 102 may access the user profile from a data store on which the user profile is stored based upon the identity of the user.

At block 508, the controller 102 may execute the instructions 116 to determine the representative fluid coverage level associated with the accessed user profile. That is, the controller 102 may determine the representative fluid coverage level associated with or contained in the accessed user profile. In another example, the controller 102 may instead determine a type of document that the user typically prints from the accessed user profile. As a further example, the controller 102 may instead determine the setting of the dryer 334 that corresponds to the user from the accessed user profile.

At block 510, the controller 102 may execute the instructions 118, 320 to control the dryer 334. That is, the controller 102 may adjust the setting of the dryer 334 according to the determined representative fluid coverage level associated with the accessed user profile. In another example, the controller 102 may adjust the setting of the dryer 334 according to the determined type of document associated with the accessed user profile. In any regard, the controller 102 may adjust the setting of the dryer 334 to match information contained in the user profile of the user.

Reference is now made to the method 600 depicted in FIG. 6, which may correspond to block 410 in the method 400 depicted in FIG. 4. That is, the method 600 may include additional operations that may be implemented with respect to block 410. Thus, for instance, the method 600 may be implemented in place of block 410 following implementation of blocks 402-408 in the method 400. In addition, the method 600 may be implemented following the control of the printing device dryer 334 to operate at a first setting based upon the representative fluid coverage level associated with a user profile. For instance, through implementation of the method 400, the setting for the dryer 334 may have been determined to be the first setting for the user based upon the user profile.

At block 602, an instruction to perform a printing operation may be received from the user associated with the user profile. That is, for instance, the user may submit a print job corresponding to the printing operation to the printing device 210 either directly or via the apparatus 302.

At block 604, a determination may be made that the printing operation includes printing of a document having a fluid coverage level that exceeds a predetermined value. The controller 304 may make this determination through an analysis of the document to be printed. The predetermined value may be a fluid coverage level that the first setting of the dryer 334 may not be able to adequately dry. In addition or as another example, an administrator may adjust the predetermined value and may thus adjust the threshold at which the dryer 334 setting is changed from a lower setting to a higher setting.

At block 606, the setting of the printing device dryer 334 may be adjusted to a second setting in response to the determination, in which, under the second setting, the printing device dryer 334 consumes a greater amount of energy than under the first setting. Thus, for instance, the controller 304 may adjust the setting of the dryer 334 to be at a higher setting than the setting originally determined for the user based upon the user's profile in instances in which the user has instructed the printing device 210 to print a document with greater fluid coverage than the user normally prints. In addition, the controller 304 may adjust the setting of the dryer 334 based upon the determined fluid coverage level, e.g., the controller 304 may adjust the setting to be higher for a higher determined fluid coverage level.

At block 608, the setting of the dryer 334 may be maintained at the second setting for a predetermined period of time regardless of a fluid coverage level of a document subsequently printed during the predetermined period of time. For instance, the controller 304 may maintain the dryer 334 at the higher setting for the predetermined period of time even if the user submits a print job having a fluid coverage level that is lower than the fluid coverage level that triggered the setting change. In one regard, the dryer 334 may be maintained at the higher setting to enable maximum printing speed for subsequent print jobs, for instance, in the event that an additional print job having a fluid coverage level that is higher than the representative fluid coverage level for that user is received during the predetermined period of time. The predetermined period of time may be user or administrator defined and may range, for instance, from about 0 seconds to about 2 hours. By way of particular example, the predetermined period of time may be between 0 seconds and 3 hours. However, other time periods may also be used.

Some or all of the operations set forth in the methods 400-600 may be contained as utilities, programs, or subprograms, in any desired computer accessible medium. In addition, the methods 400-600 may be embodied by computer programs, which may exist in a variety of forms both active and inactive. For example, they may exist as machine readable instructions, including source code, object code, executable code or other formats. Any of the above may be embodied on a non-transitory computer readable medium. Examples of non-transitory computer readable media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
a controller; and
a non-transitory computer readable medium on which is stored instructions that are to cause the controller to:
predict that a user is to instruct a printing device to perform a printing operation, said printing device having a dryer;
identify the user in response to the prediction;
access a user profile corresponding to the identified user, wherein the accessed profile identifies a type of document that the identified user typically prints; and
adjust a setting of the dryer according to the identified type of document in the accessed profile.

2. The apparatus according to claim 1, wherein the controller is to adjust the setting of the dryer to one of a plurality of settings, wherein the dryer consumes different amounts of energy under the plurality of settings.

3. The apparatus according to claim 2, wherein the instructions are further to cause the controller to:
adjust the setting of the dryer to a first setting of the plurality of settings;
receiving an instruction to perform a printing operation;
determine that the printing operation includes printing of a document having fluid coverage that exceeds a predetermined value; and
adjust the setting of the dryer to a second setting of the plurality of settings in response to the determination.

4. The apparatus according to claim 3, wherein the instructions are further to cause the controller to:
maintain the setting at the second setting for a predetermined period of time regardless of an identified type of document in a subsequently received printing operation instruction.

5. The apparatus according to claim 4, wherein the predetermined period of time comprises a period of time between about 1 minute and about two hours.

6. The apparatus according to claim 1, further comprising:
a data store on which is stored user profiles of a plurality of users, wherein the controller is to access the data store to access the user profile.

7. The apparatus according to claim 6, wherein the instructions are further to cause the controller to:
track types of documents printed by each of the plurality of users;
determine, for each of the plurality of users, a typical type of document that the user prints from the tracked types of documents printed by each of the plurality of users;
associate the determined typical type of document with a corresponding user profile for each of the user profiles; and
store the association with the user profiles in the data store.

8. The apparatus according to claim 1, further comprising:
a printing element to apply liquid onto a medium; and
the dryer, wherein the dryer is to dry the liquid and the medium.

9. A method of operating a printing device dryer, said method comprising:
tracking fluid coverage levels on documents printed by each of a plurality of users;
determining, for each of the plurality of users, a representative fluid coverage level for the documents that the user prints from the tracked fluid coverage levels;
associating, for each of the plurality of users, the determined representative fluid coverage level with a corresponding user profile;
storing the associations with the user profiles in a data store; and
controlling the printing device dryer to operate at one of a plurality of settings based upon the representative fluid coverage level associated with the user profiles.

10. The method according to claim 9, wherein each of the plurality of settings corresponds to a respective range of representative fluid coverage levels, said method further comprising:
determining that a user is to instruct the printing device to perform a printing operation;
identifying the user;
accessing a user profile of the user;
determining, from the data store, the representative fluid coverage level associated with the user profile; and
wherein controlling the printing device dryer further comprises controlling the printing device dryer to operate at the setting corresponding to the determined representative fluid coverage for the identified user profile.

11. The method according to claim 9, wherein determining that the user is to instruct the printing device to perform a printing operation further comprises predicting that the user is likely to instruct the printing device perform a printing operation.

12. The method according to claim 9, wherein controlling the printing device dryer comprises controlling the printing device dryer to operate at a first setting based upon the representative fluid coverage level associated with a user profile, said method further comprising:
receiving an instruction to perform a printing operation from the user associated with the user profile;
determining that the printing operation includes printing of a document having a fluid coverage level that exceeds a predetermined value; and
adjusting the setting of the printing device dryer to a second setting in response to the determination, wherein under the second setting, the printing device dryer consumes a greater amount of energy than under the first setting.

13. The method according to claim 12, further comprising:
maintaining the setting at the second setting for a predetermined period of time regardless of a fluid coverage level of a document subsequently printed during the predetermined period of time.

14. A non-transitory computer readable medium on which is stored machine readable instructions that when executed by a controller, cause the controller to:
track fluid coverage levels on documents printed by each of a plurality of users;
determine, for each of the plurality of users, a representative fluid coverage level for the documents that the user prints from the tracked fluid coverage levels;
associate, for each of the plurality of users, the determined representative fluid coverage level with a corresponding user profile;
store the associations with the user profiles in a data store; and
control the printing device dryer to operate at one of a plurality of settings based upon the representative fluid coverage level associated with the user profiles, wherein each of the plurality of settings corresponds to a respective range of representative fluid coverage levels.

15. The non-transitory computer readable medium according to claim 14, wherein the machine readable instructions are further to cause the controller to:
determine that a user is to instruct the printing device to perform a printing operation;
identify a user profile of the user;
determine the representative fluid coverage level associated with the user profile; and
control the printing device dryer to operate at the setting corresponding to the determined representative fluid coverage for the identified user profile.

* * * * *